(12) United States Patent
Minsley et al.

(10) Patent No.: US 12,567,294 B1
(45) Date of Patent: Mar. 3, 2026

(54) SYSTEM AND METHOD FOR CUSTOMIZED PREMISES ACCESS CONTROL

(71) Applicant: DAVINCI LOCK LLC, Raleigh, NC (US)

(72) Inventors: Bradford A. Minsley, Raleigh, NC (US); Clifton P. Minsley, Raleigh, NC (US)

(73) Assignee: DAVINCI LOCK LLC, Raleigh, NC (US)

( * ) Notice: Subject to any disclaimer, the term of this patent is extended or adjusted under 35 U.S.C. 154(b) by 0 days.

(21) Appl. No.: 19/330,096

(22) Filed: Sep. 16, 2025

(51) Int. Cl.
| | |
|---|---|
| *G07C 9/00* | (2020.01) |
| *G01N 9/00* | (2006.01) |
| *G01V 3/10* | (2006.01) |
| *G06V 20/52* | (2022.01) |

(52) U.S. Cl.
CPC ......... *G07C 9/00309* (2013.01); *G01N 9/002* (2013.01); *G01V 3/10* (2013.01); *G06V 20/52* (2022.01)

(58) Field of Classification Search
CPC .... G07C 9/00309; G06V 20/52; G01N 9/002; G01V 3/10
See application file for complete search history.

(56) References Cited

U.S. PATENT DOCUMENTS

| | | | | |
|---|---|---|---|---|
| 2004/0121448 A1* | 6/2004 | Goh | ..................... | B01J 19/0046 |
| | | | | 435/287.1 |
| 2005/0033691 A1* | 2/2005 | Whewell | ............... | H04M 17/00 |
| | | | | 705/40 |
| 2014/0376769 A1* | 12/2014 | Bulan | .................... | G06V 20/52 |
| | | | | 382/103 |
| 2018/0324393 A1* | 11/2018 | Ryan | ..................... | H04N 7/188 |

FOREIGN PATENT DOCUMENTS

| | | | | | |
|---|---|---|---|---|---|
| CA | 2558906 | A1 | * | 4/2007 | ........... H04L 51/224 |
| CA | 3148264 | A1 | * | 3/2021 | ......... G07D 11/0093 |
| CN | 1339136 | A | * | 3/2002 | ............. G06V 20/64 |
| CN | 115496244 | B | * | 4/2023 | ............. G06Q 10/30 |
| FR | 2894233 | A1 | * | 6/2007 | ................ B65F 1/10 |
| JP | 2007170962 | A | * | 7/2007 | |
| JP | 4542691 | B2 | * | 9/2010 | ............. G01V 3/104 |
| JP | 2019127372 | A | * | 8/2019 | |
| TW | I535292 | B | * | 5/2016 | |

* cited by examiner

*Primary Examiner* — Yong Hang Jiang
(74) *Attorney, Agent, or Firm* — Williams Mullen; Thomas F. Bergert

(57) ABSTRACT

Embodiments of the present disclosure determine and/or estimate mass, volume and density of objects being stored in a controlled access environment. Tenant objects and/or storage contents can be detected in an enclosed area, and a mass and/or load adversity estimate for the contents can be determined. The mass and/or load adversity estimate can then be compared to a predetermined threshold, and if the threshold is met, exceeded, or not met, a determination can be made as to whether to unlock a physical lock on a storage unit around the enclosed area and/or alerts can be issued to facilitate premises operation and/or tenant communications.

27 Claims, 4 Drawing Sheets

Fig. 4

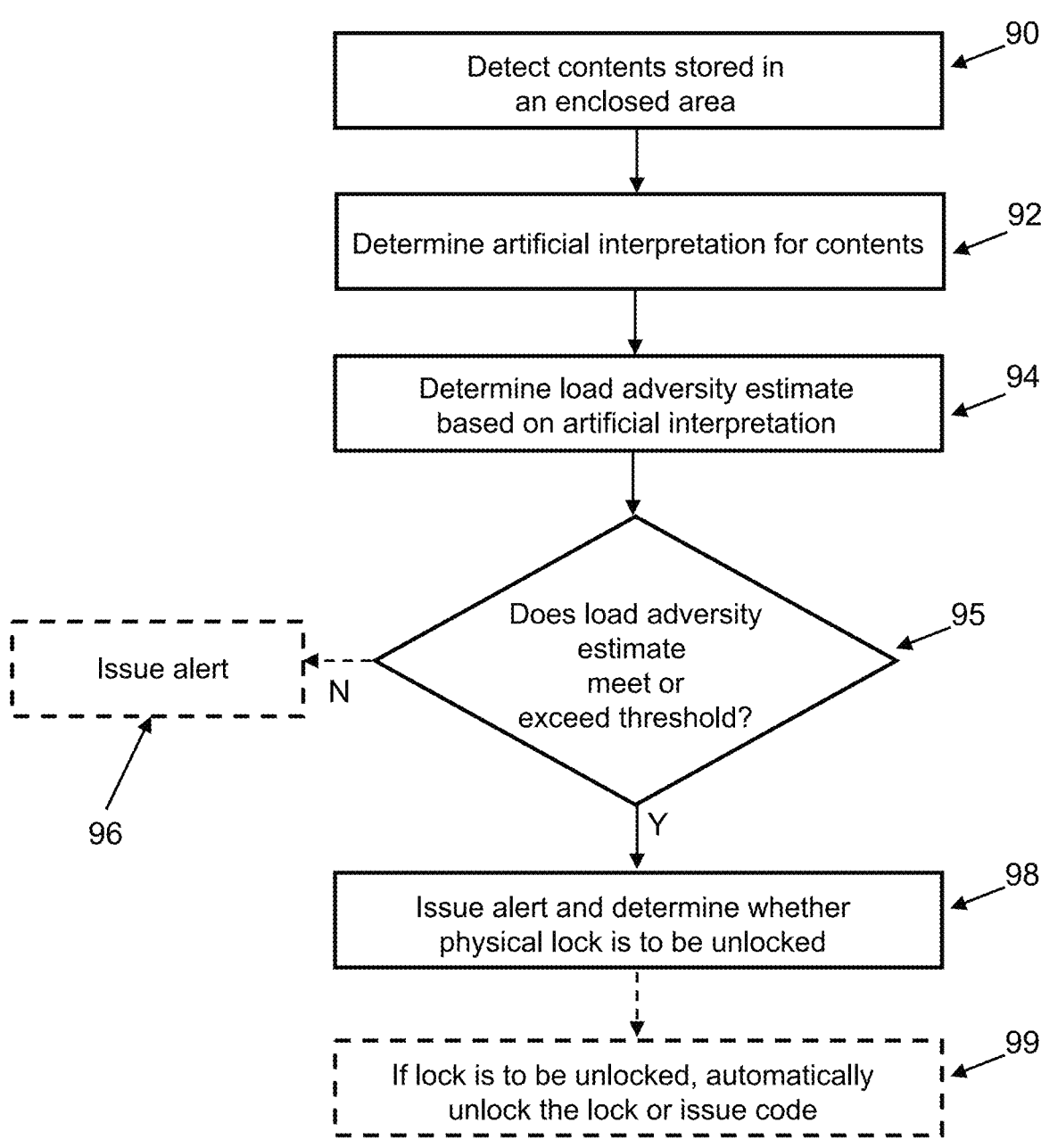

Detect contents stored in
an enclosed area — 90

Determine artificial interpretation for contents — 92

Determine load adversity estimate
based on artificial interpretation — 94

Does load adversity
estimate
meet or
exceed threshold? — 95

N — Issue alert

96

Y

Issue alert and determine whether
physical lock is to be unlocked — 98

If lock is to be unlocked, automatically
unlock the lock or issue code — 99

SYSTEM AND METHOD FOR CUSTOMIZED PREMISES ACCESS CONTROL

TECHNICAL FIELD

The present disclosure relates generally to the field of access control and more particularly to a system and method for customized premises access control.

BACKGROUND AND SUMMARY

Access control problems exist in different commercial and personal environments such as self-storage facilities, warehouses, marinas, businesses, cargo shipping, home rentals, recreational activity locations, sports clubs and other locations. Different types of assets, whether physical or virtual, may be protected from general access through one or more access control features such as a gate surrounding a premises, a physical lock such as a combination lock and/or electronic security and surveillance measures. Surveillance on premises can take the form of cameras, physical presence sensors, motion detectors, weight sensors, human security personnel and other forms.

Invariably, it is difficult to customize premises management for different tenants or users to facilitate employing the proper size unit and rental arrangements for each user. Further, customizing premises management based on mass, volume, density and/or load adversity of each tenant's objects being stored is not heretofore performed in a manner that facilitates storage efficiencies for premises management and tenants.

According to embodiments of the present disclosure, a system, device and method can be employed to determine and/or estimate load adversity, including mass, volume and/or density of objects being stored in a controlled access environment. Tenant objects and/or storage contents can be detected in an enclosed area, and a load adversity estimate for the contents can be determined based, for example, on a volume estimate and density estimate for the contents. In various embodiments, the load adversity estimate is a mass estimate. The load adversity estimate can then be compared to a predetermined threshold, and if the threshold is met or exceeded, alerts can be issued to facilitate premises operation and tenant management.

Communications with a remote system such as a premises management system can be employed, and the remote system can, in various embodiments, perform the comparison of the load adversity or other estimate with the threshold. In various embodiments, the system and method can assess rental rate changes and/or suggest unit sizes based upon determined load adversity of a unit's contents. In various embodiments, the system and method can update the remote system to update an account associated with the tenant and/or user to reflect a rent change or other change or suggestion at the next scheduled account event. Aspects of the present disclosure provide a system, device and method that provide a technical solution to the above problems and more.

BRIEF DESCRIPTION OF THE DRAWINGS

These and other embodiments of the disclosure will be discussed with reference to the following exemplary and non-limiting illustrations, in which like elements are numbered similarly, and where:

FIGS. 2 through 4 are exemplary flow diagrams illustrating aspects of the present disclosure.

DETAILED DESCRIPTION

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims. In addition, the present disclosure describes, among other things, a premises management system, device and method. Although embodiments herein are described with respect to their application in certain environments and locations, it is understood that the presently described embodiments can be implemented in any setting where access control may be useful.

It will be appreciated that reference to "a", "an" or other indefinite article in the present disclosure encompasses one or more than one of the described element. Thus, for example, reference to a unit may encompass one or more units, reference to a user may encompass one or more users, reference to a camera may encompass one or more cameras and so forth.

Figure 1:
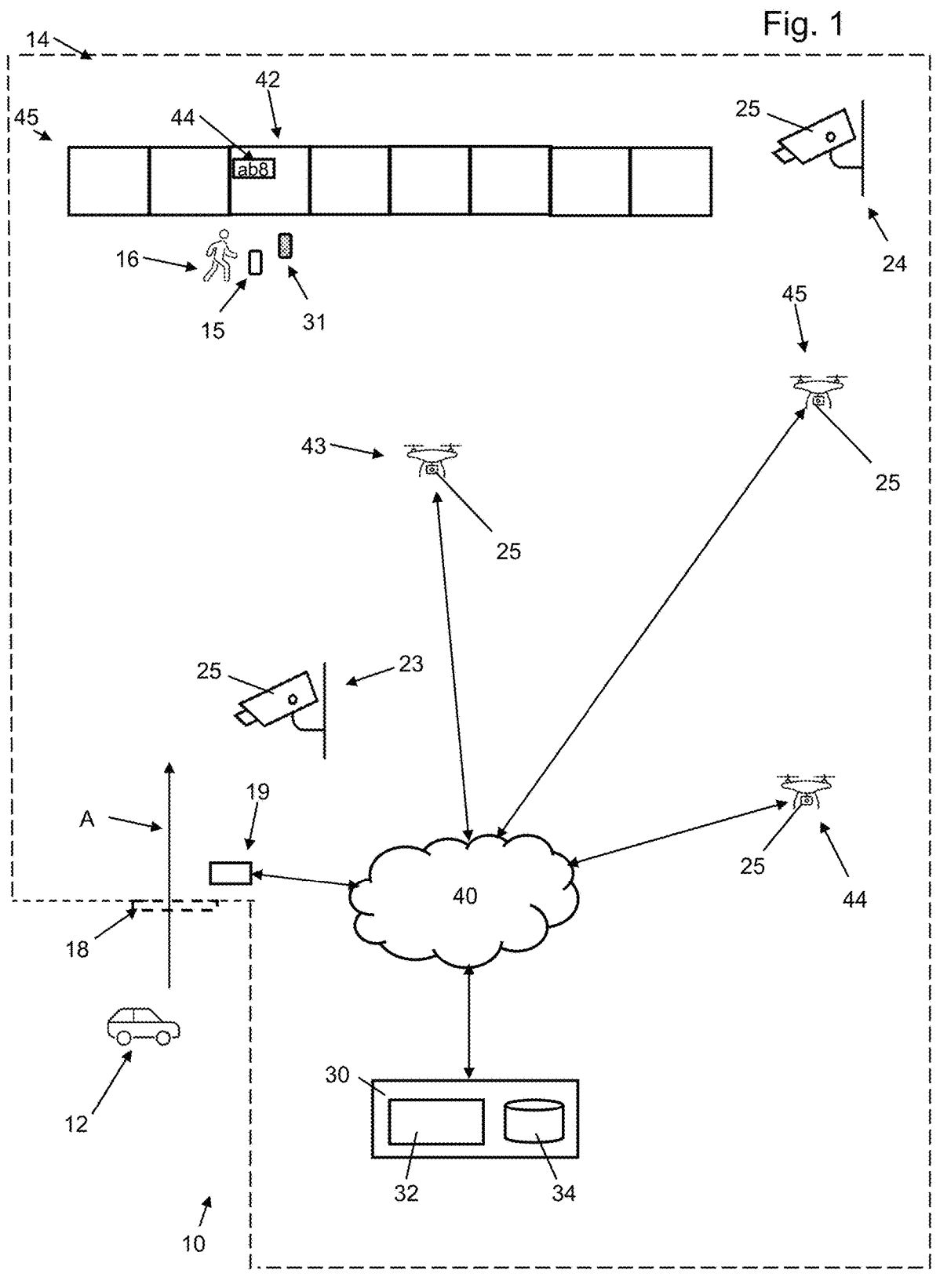
FIG. 1 is a schematic diagram illustrating embodiments of the present disclosure.

FIG. 1 is a schematic diagram of an access control system 10 in accordance with embodiments of the present disclosure. In various embodiments, the system can be implemented in connection with a self-storage and/or other access control environments, shown generally at 14. As shown in FIG. 1, a user 16 has a communications device 15, which may be a mobile communications device and which is capable of communication with a remote system 30 such as a premises management system over a network 40. The remote system 30 can be or include premises monitoring device(s) and/or software. The network 40 may be any type of network suitable to allow interaction between devices, such as a mobile device 15, an entry point 18 such as a gate, a local control unit 19 and the remote system 30. For example, the network 40 may be a wired network, a wireless network, or any combination thereof. Further, the network 40 may include a distributed computing network, an intranet, a local-area network (LAN) and/or a wide-area network (WAN), or any combination thereof. For example, the LAN may make use of WIFI in its many variations and the WAN may make use of broadband, cellular and/or satellite networks using technologies including, but not limited to, CDPD, CDMA, GSM, PDC, PHS, TDMA, FLEX, REFLEX, iDEN, TETRA, DECT, DataTAC, Mobitex, EDGE and other 2G, 3G, 4G and LTE technologies. However, those of ordinary skill in the art will appreciate that the network 40 is not limited thereto. It will be appreciated that the mobile communications device 15 is not limited to a mobile phone, and can include tablets, wearable devices, personal digital assistants (PDAs), laptop computers, "smart" watches, "smart" glasses, and any other device capable of receiving input from the customer, and which is capable of being connected to the network 40.

Once access is gained into the facility 14, the user 16 can take action such as opening and using the user's storage unit 42, which can be considered a closure device around an enclosed area according to the present disclosure. In various embodiments, the storage unit 42 may be provided with a unit number 44 that is visible on an exterior thereof. According to various embodiments, one or more cameras can detect the user, the user's activity and/or the storage unit number 44 visually. In the case of storage unit number detection, such can occur directly through optical character recognition (OCR) or can occur indirectly by the camera recognizing which unit 42 the user is near or in front of from among a group 45 of units. For example, if the group 45 of units is known to be a line of eight units, the user's unit 42 can be detected as being the third unit in the line of eight units in the group 45. In further embodiments, the image recognition system or device can detect a feature of the closure device such as a door with a colored tag or label on it. The system can operate so as to detect other physical features such as a combination padlock that is identifiable or a dent at some identifiable location that is detectable by the camera. The system can further operate to determine the unit involved based upon the camera's location of image capture by comparing the camera's location of image capture to the location of the unit having an open door and resolving the identity of the unit based upon the calculated location of the unit versus a registry of unit locations, for example.

Regardless of approach, once the user gains access through an access signal such as by using a code or a credential as described herein, and/or once the user, the user's vehicle and/or the user's unit is determined, the system can determine what account is associated with the user, the user's vehicle and/or the user's unit 42. This determination can be performed locally or through a remote system 30 such as a premises management system having a processor 32 and a memory 34. It will be appreciated that the remote system 30 and the image recognition system of the present disclosure can incorporate necessary processing power and memory for storing data and programming that can be employed by the processor to carry out the functions and communications necessary to facilitate the processes and functionalities described herein. It will further be appreciated that embodiments of the present disclosure contemplate that the image recognition system and remote system can be part of the same system.

According to various embodiments as disclosed herein and as shown in the drawings, a system 10 is provided for customized premises monitoring and can include, for example, an image recognition system or device as described elsewhere herein. The image recognition system or device can be provided in the form of one or more surveillance cameras 25 which can be stationary 23, 24 or mobile such as when secured to one or more drones 43, 44, 45. In stationary form, the camera(s) may be secured to a pole, wall, rooftop or other physically stationary device. The image recognition system or device, including one or more cameras 25 and/or devices to which the cameras are affixed can include a processor and software instructions operable to recognize images and status information. For example, one or more cameras 25 can capture an image of closure device (e.g., storage unit) 42 and the image recognition system or device can detect details regarding the user 16, the user's vehicle 12 and the unit 42. In various embodiments, one or more cameras 25 can also detect the user's communications device 15. While the image recognition system or device can operate entirely locally via the camera and local processing, the image recognition system or device can also operate as part of a remote system 30 such as a premises management system, which can include a processor 32 and a memory 34 storing instructions for operations as described herein. In addition to optionally processing and recognizing images, the remote system 30 can also operate to detect whether the user 16 has properly gained access to the premises, such as by providing a badge or other form of identification at a premises gate, for example.

In various embodiments, the system 10 includes a content determination subsystem that can include a device 31 operable to detect contents that can include one or more objects stored in an enclosed area such as a closure device and determine a load adversity estimate for the contents. The device 31 can be operated by a user such as a user 16 with an account and/or rental unit, or a different user who may be affiliated with the premises management system. In various embodiments, the device 31 can be remotely controlled. The device 31 is capable of communication with the remote system 30 over the network 40. The device 31 can incorporate necessary processing power and memory for storing data and programming that can be employed by the processor to carry out the functions and communications necessary to facilitate the processes and functionalities described herein. It will further be appreciated that embodiments of the present disclosure contemplate that the device 31, the content determination subsystem and remote system can be part of the same system. In various embodiments, the device 31 can be a borescope and/or a fiber optic camera communicably coupled to a communications device such as the communications device 15 or another communications device, and can determine an artificial interpretation of the contents in the enclosed area based on an image captured by the fiber optic camera. The device 31 can also be embodied as a vibration and acoustic resonance sensor, a material recognition (e.g., material identification) device, a 3D scanning device, and/or an electromagnetic induction sensor. In the event an electromagnetic induction sensor is employed as the device 31, the device 31 induces a magnetic field and detects a response from the object.

In embodiments where the device 31 is a vibration and acoustic resonance sensor, sound waves or vibrations can be applied to one or more contents in a storage unit or enclosure (e.g., through a speaker or transducer), and the way the contents respond (i.e., resonant frequency) can provide details for estimating the mass and density of the contents. Heavier objects typically have lower resonance frequencies. As an example, determining the density estimate can include directing a sound wave or vibration toward the object by the device and receiving a responsive resonance frequency by the device.

In embodiments where the device 31 is a material recognition device, the device may employ machine learning and/or computer vision such as a camera and software to analyze the texture, color, and other visual cues of the contents to identify the most likely materials used in the contents and determine an artificial interpretation thereof. In various embodiments, the device can compare the contents to a database of typically stored contents and their material compositions to assess the type of contents stored in determining a material forming at least a part of the object. From such comparison, an estimate of the mass and/or density of the contents can be made. It will be appreciated that embodiments of the material recognition device can be or include a hyperspectral imaging device. In embodiments where the device 31 is a 3D scanning device, 3D scanning (such as LIDAR) or computer vision can be employed to measure volume. Once the volume is measured with one of these technologies, the system can estimate the load adversity estimate and optionally the mass by assuming a range of potential materials commonly used in the contents (e.g., wood, fabric, and foam are commonly used in couches). Based on these assumptions, the system can calculate an approximate density by dividing mass by volume. In embodiments where the device 31 is one or more electromagnetic induction sensors, if any of the contents (e.g., a couch) has a metal frame or components, the electromagnetic sensors can detect the response of metal parts to induced magnetic fields. This can provide an indication of the presence and distribution of metal, contributing to an estimate of mass by the system.

It will be appreciated that the detected contents can include at least one object stored within the enclosed area of a given storage unit, even though the storage unit may be locked with a physical lock preventing unauthorized access to the enclosed area. Upon detecting the contents, embodiments of the system and/or method as disclosed herein determine an artificial interpretation of the contents and determine a load adversity estimate based on the determined artificial interpretation. The artificial interpretation is not necessarily an accurate description of the actual contents within the enclosed area but rather an interpretation that may or may not be exactly accurate regarding the nature of the actual contents. The load adversity estimate is an estimate of negative impact or potential negative impact of the contents, such as, for example, the difficulty in moving the contents (e.g., if heavy or bulky), the impermissibility of the contents (e.g., if tires or explosives are identified as the artificial interpretation of the contents and tires or explosives are not permitted to be stored in the storage unit) and/or the mass or volume of the contents (e.g., if the contents take up a small percentage of the available space in the enclosed area, the contents could be moved to a smaller unit).

In various embodiments, the load adversity estimate is measured by a common unit of measure (e.g., a weight measurement, a density measurement or a volume measurement) but can also be measured by an artificial unit such as an adversity unit that is scaled from a level of no adversity to a level of highest adversity. Further, the system and/or method can employ a pre-established load adversity threshold and can trigger action based upon whether the determined load adversity estimate meets or exceeds the pre-established threshold. For example, upon the determined load adversity estimate meeting or exceeding the pre-established threshold the system and/or method can issue an alert and determine whether the physical lock is to be unlocked. The determination whether to unlock the physical lock can be assessed based on safety, risk and/or violation of an agreement, for example. If tires are not permitted to be stored in an enclosed area for safety or policy reasons, for example, upon discovering one or more tires in an enclosed area or perceiving that tires are being stored, the system and/or method according to the present disclosure may determine that the physical lock on the storage unit is to be unlocked and remedial action taken. In various embodiments, upon determining that the physical lock is to be unlocked, the system and/or method automatically unlock the physical lock, such as in the case where the physical lock is an electronic lock. In other embodiments, such as where the physical lock is not capable of electronic communication, the system and/or method can issue an unlock code to a communications device, and a user of the communications device can use the unlock code to unlock the physical lock.

In various embodiments, a density estimate of the contents and an unused space estimate for the enclosed area is determined. Further, determining a load adversity estimate for the contents can be based on the volume estimate and the unused space estimate. In other embodiments, determining a load adversity estimate can include determining a mass estimate of the contents.

In various embodiments, the device 31 can, for example, take its measurement from outside of a storage unit or enclosure by either looking through a small hole in the access barrier (e.g., door), looking over or around the access barrier or being able to measure through the access barrier. It will be appreciated that the device can be fully outside the enclosed area, fully inside the enclosed area or partially within and partially outside of the enclosed area. The device 31 can be manually manipulated into position so as to be able to perform a load adversity estimate of contents in an enclosure, according to various embodiments. In other embodiments, the device 31 can be positioned on a mount (not shown) with appropriate access to the contents within an enclosure to perform the load adversity estimate. The mount can be a stationary object or a mobile object such as a drone, manual cart or robotic/remote-controlled device, for example. The system (e.g., remote system 30) can receive the load adversity estimate from the device 31 and, upon the load adversity estimate being below a pre-established threshold, issue an alert, such as an alert to a tenant. Further, upon the load adversity estimate meeting or exceeding a pre-established threshold, an alert can be issued to a tenant or a premises management system, for example. Thresholds can be pre-established according to unit sizes or other factors, for example. According to various embodiments, upon the load adversity estimate being below a pre-established threshold, an alert can be issued to a tenant. The alert to the tenant can be a recommendation to reduce or increase the size of the enclosed area, an advance vacancy alert or a pricing alert, for example. In various embodiments, the alert to the tenant can be a recommendation to reduce or increase the size of the enclosed area. Exemplary alerts to the premises management system can include an advance vacancy alert or a pricing alert or change. According to various embodiments, the alert is an automatic rate adjustment for a tenant account, and a pricing change can be automatically executed to change a rental rate or other payment amount for a user's account based on the determined mass estimate of the contents in the enclosure, regardless of whether any communication is issued directly to the tenant at the time.

According to various embodiments, the device is a borescope and/or a fiber optic camera communicably coupled to the communications device and wherein determining the artificial interpretation of the contents is based on an image captured by the fiber optic camera. In alternative embodiments, the device can be a vibration and acoustic resonance sensor. In such embodiments, determining the density estimate can occur by directing a sound wave or vibration toward the object by the device and receiving a responsive resonance frequency by the device. In still other embodiments, the device can be a material recognition device, and determining the density estimate can include determining, by the device, a material forming at least a part of the object. In still other embodiments, the device is an electromagnetic induction sensor, a hyperspectral imaging device or a 3D scanning device, in which case determining the density estimate comprises determining, by the device, a material forming at least a part of the object.

Figure 2:
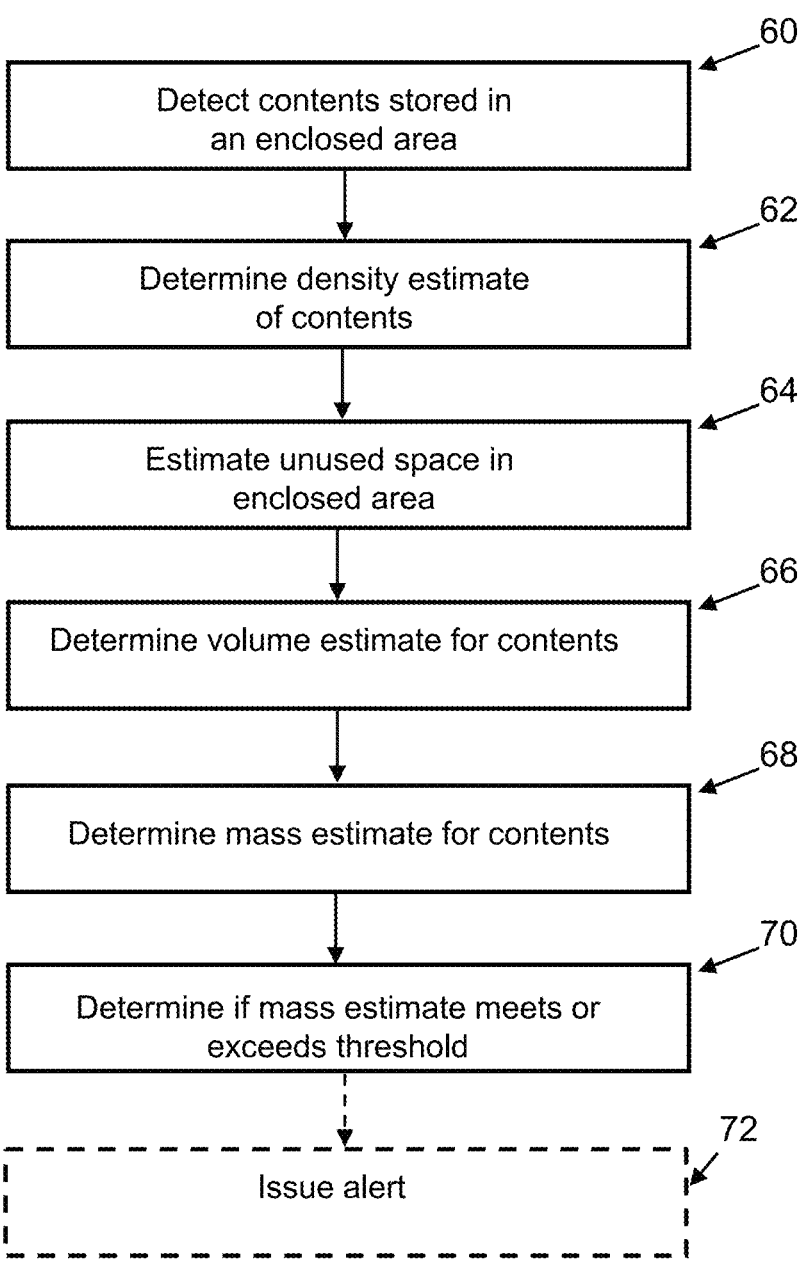

According to various embodiments as disclosed herein and as shown in FIG. 2, a computer-implemented method operates whereby, as at 60, a device (e.g., device 31) outside an enclosed area detects contents including at least one object stored in the enclosed area. As at 62, a density estimate of the contents is determined. As at 64, unused space in the enclosed area is estimated. As at 66, a volume estimate for the contents is determined based on the esti- mated unused space. As at 68, a mass estimate for the contents based on the volume estimate and the density estimate is determined. As at 70, upon the mass estimate meeting or exceeding a pre-established threshold, an alert can optionally be issued. Such alert can be or include a message to a user and/or account holder indicating a rental adjustment and/or a recommendation such as described herein. In various embodiments, the alert is an electronic communication to a tenant and/or the alert is an electronic communication to a premises management system.

Figure 3:
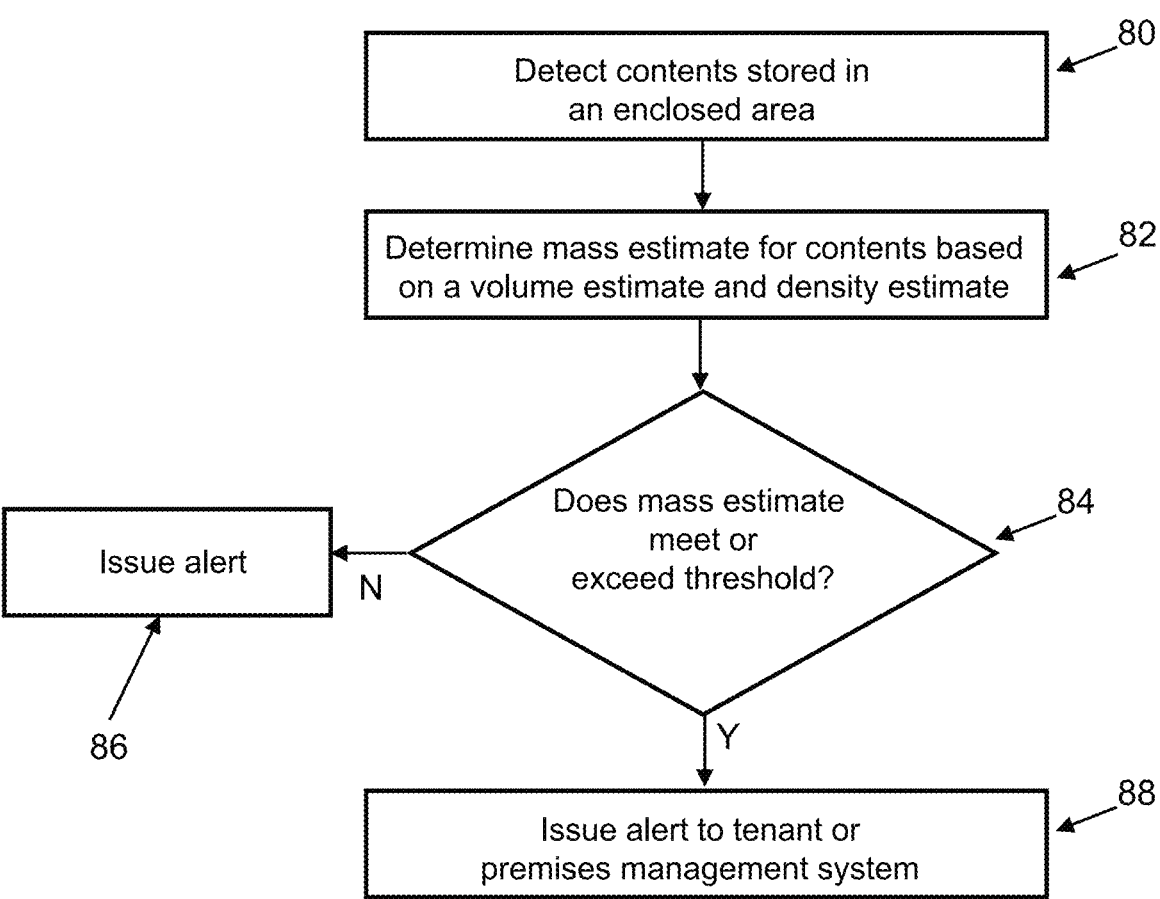

According to various embodiments as disclosed herein and as shown in FIG. 3, a computer-implemented method operates whereby, as at 80, a device (e.g., 31) outside an enclosed area detects contents including at least one object stored in the enclosed area. As at 82, a mass estimate for the contents is determined based on a volume estimate and a density estimate of the contents. As at 84, a determination is made as to whether mass estimate meets or exceeds a pre-established threshold. As at 86, if the mass estimate does not meet or exceed the pre-established threshold, i.e., if the mass estimate is below the pre-established threshold, an alert can be issued. As at 88, if the mass estimate does meet or exceed the pre-established threshold, an alert can be issued to a tenant or a premises management system. In various embodiments, the alert to the tenant can be a recommendation to reduce or increase the size of the enclosed area for more efficient space and cost management. In various embodiments, the alert to the premises manage- ment system can be an advance vacancy alert or a pricing alert or change, as described elsewhere herein. In further embodiments, the alert can be an instruction to the premises management system and optionally the tenant to automati- cally increase the tenant's cost, i.e., the rental rate to the tenant.

According to various embodiments as disclosed herein and as shown in FIG. 4, a computer-implemented method operates whereby, as at 90, a device (e.g., 31) outside an enclosed area detects contents including at least one object stored in the enclosed area. As at 92, an artificial interpre- tation of the contents is determined. As at 94, a load adversity estimate is determined based on the determined artificial interpretation. As at 95, a determination is made as to whether the load adversity estimate meets or exceeds a pre-established threshold. As at 96 and shown as optional in dashed lines, if the load adversity estimate does not meet or exceed the pre-established threshold, i.e., if the load adver- sity estimate is below the pre-established threshold, an alert can be issued. As at 98, if the mass estimate does meet or exceed the pre-established threshold, an alert can be issued and a determination is made whether a physical lock is to be unlocked. As at 99 and shown as optional in dashed lines, upon determining that the physical lock is to be unlocked, it can be automatically unlocked or an unlock code can be issued to a communications device.

In various embodiments, the alert can be a recommenda- tion to a tenant to reduce or increase the size of the enclosed area for more efficient space and cost management, for example. In various embodiments, the alert to the premises management system can be an advance vacancy alert or a pricing alert or change, as described elsewhere herein. In further embodiments, the alert can be an instruction to the premises management system and optionally the tenant to automatically increase the tenant's cost, i.e., the rental rate to the tenant.

It will be appreciated that embodiments as described herein provide an effective, technical approach and solution to customized premises monitoring with customized notifi- cations that may automatically adjust rental accounts with- out direct action by a user and optionally with unlocking of units based upon determinations as made herein, for example. As will be appreciated according to the present disclosure, an automated rental account adjustment can be triggered based on the determined load adversity estimate. In various embodiments, the rental account adjustment is a rental rate adjustment. Also, the rental rate adjustment can be based on a scale according to various embodiments. In various embodiments, if the assessed load adversity estimate is low and/or below a pre-established threshold, the adjust- ment may be lowered and/or a recommendation may be made for a smaller unit, which may involve a lower cost.

Although the present disclosure may be described in instances with respect to self-storage facilities, it will be appreciated that embodiments of the present disclosure can be implemented in any setting where access control for a closure or closure device may be useful, such as hotel rooms, apartment buildings, storage containers, short-term housing rentals, lockers and other environments as described herein, for example. A "unit" need not be a storage unit but can be considered in different embodiments as a room, a building, a container, a venue, a physical location, a locker and/or other environments. In addition, the present disclosure can be implemented within a controlled access system (CAS), such as for equipment rooms, vaults, hospitals, airports, government facilities, nuclear power facilities, water treat- ment facilities, weapon storage facilities, aircraft cockpits, and any other setting that requires restricted, selective, or monitored access. Environments and/or locations in which embodiments of the present disclosure may operate include, in addition to self-storage facilities, education and member- ship environments with locks on school lockers and/or sports club lockers, transportation environments with locks on cargo containers, utility environments with locks on natural gas meters, transformer boxes or other physical utility feature, marinas and boat storage environments with locks on boats such as may be used to secure the boats to a dock or a mooring piling, parcel delivery environments where locks are used to secure containers for at-home delivery, shared transport environments such as may be used for temporary use of bikes, scooters, and other forms of transportation, for example.

As used herein, the term "customer" can include a renter, client, tenant, lessee, user, owner or an authorized agent, and the term "user" can be used interchangeably with "cus- tomer" herein.

In certain embodiments in which the system includes a computing device, such as a mobile communications device, a premises management system, an image recognition sys- tem or device, a content determination system, a device, a remote system, a remote server, etc., the computing device is any suitable computing device (such as a server) that includes at least one processor and at least one memory device or data storage device. As further described herein, the computing device includes at least one processor con- figured to transmit and receive data or signals representing events, messages, commands, or any other suitable information between the computing device and other devices. The processor of the computing device is configured to execute the events, messages, or commands represented by such data or signals in conjunction with the operation of the computing device.

It will be appreciated that any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing, including a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

It will be appreciated that all of the disclosed methods and procedures herein can be implemented using one or more computer programs or components. These components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server.

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

Although the present approach has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present approach.

The invention claimed is:

1. A computer-implemented method, comprising:

detecting, by a device, contents comprising at least one object stored within an enclosed area, wherein the enclosed area comprises a storage unit with a physical lock preventing unauthorized access to the enclosed area;

determining an artificial interpretation of the contents;

determining a load adversity estimate based on the determined artificial interpretation;

upon the load adversity estimate meeting or exceeding a pre-established threshold, issuing an alert and determining whether the physical lock is to be unlocked, wherein the alert comprises an automatic rate adjustment for a tenant account; and upon determining that the physical lock is to be unlocked, automatically unlocking the physical lock or issuing an unlock code to a communications device.

2. The computer-implemented method of claim 1, further comprising determining a density estimate of the contents and an unused space estimate for the enclosed area; and wherein determining a load adversity estimate for the contents based on a volume estimate and the unused space estimate.

3. The computer-implemented method of claim 1, wherein the device comprises a fiber optic camera communicably coupled to the communications device and wherein determining the artificial interpretation of the contents is based on an image captured by the fiber optic camera.

4. The computer-implemented method of claim 1, wherein the device comprises a vibration and acoustic resonance sensor.

5. The computer-implemented method of claim 4, wherein determining a density estimate comprises directing a sound wave or vibration toward the object by the device and receiving a responsive resonance frequency by the device.

6. The computer-implemented method of claim 1, wherein the device comprises a material recognition device.

7. The computer-implemented method of claim 6, wherein determining a density estimate comprises determining, by the device, a material forming at least a part of the object.

8. The computer-implemented method of claim 6, wherein the device comprises a hyperspectral imaging device.

9. The computer-implemented method of claim 1, wherein the device comprises a 3D scanning device.

10. The computer-implemented method of claim 9, wherein determining a density estimate comprises determining, by the device, a material forming at least a part of the object.

11. The computer-implemented method of claim 1, wherein the device comprises an electromagnetic induction sensor.

12. The computer-implemented method of claim 11, wherein the device induces a magnetic field and detects a response from the object.

13. The computer-implemented method of claim 1, wherein the alert comprises an electronic communication to a tenant.

14. The computer-implemented method of claim 1, wherein the alert comprises an electronic communication to a premises management system.

15. The computer-implemented method of claim 1, wherein determining a load adversity estimate comprises determining a mass estimate of the contents.

16. The computer-implemented method of claim 1, wherein the device is at least partially outside the enclosed area.

17. A computer-implemented method, comprising:

detecting, by a device, contents comprising at least one object stored in an enclosed area, wherein the enclosed area comprises a storage unit with a physical lock preventing unauthorized access to the enclosed area;

determining a load adversity estimate for the contents;

upon the load adversity estimate being below a pre-established threshold, issuing an alert to a tenant;

upon the load adversity estimate meeting or exceeding a pre-established threshold, issuing an alert to a tenant or a premises management system and determining whether the physical lock is to be unlocked, wherein the alert comprises an automatic rate adjustment for a tenant account; and upon determining that the physical lock is to be unlocked, automatically unlocking the physical lock or issuing an unlock code to a communications device.

18. The computer-implemented method of claim 17, wherein the alert to the tenant comprises a recommendation to reduce or increase the size of the enclosed area.

19. The computer-implemented method of claim 17, wherein the alert to the premises management system comprises an advance vacancy alert or a pricing alert.

20. The computer-implemented method of claim 17, wherein the device is at least partially outside the enclosed area.

21. A system, comprising:

a device operable to detect contents comprising at least one object stored in an enclosed area and determine a load adversity estimate for the contents, wherein the enclosed area comprises a storage unit with a physical lock preventing unauthorized access to the enclosed area, contents comprising at least one object stored in the enclosed area; and a processor and a memory storing instructions, wherein the instructions are operable to cause the processor to:

receive the load adversity estimate from the device; and upon the load adversity estimate being below a pre-established threshold, issuing an alert to a tenant, wherein the alert comprises an automatic rate adjustment for a tenant account;

upon the load adversity estimate meeting or exceeding a pre-established threshold, issuing an alert to a tenant or a premises management system and determining whether the physical lock is to be unlocked; and upon determining that the physical lock is to be unlocked, automatically unlocking the physical lock or issuing an unlock code to a communications device.

22. The system of claim 21, wherein the alert to the tenant comprises a recommendation to reduce or increase the size of the enclosed area.

23. The system of claim 21, wherein the alert to the premises management system comprises an advance vacancy alert or a pricing alert.

24. The system of claim 21, wherein the device comprises at least one of: a fiber optic camera, a vibration and acoustic resonance sensor, a material recognition device, a 3D scanning device, and an electromagnetic induction sensor.

25. A computer-implemented method, comprising:

detecting, by a device, contents comprising at least one object stored in an enclosed area, wherein the enclosed area comprises a storage unit with a physical lock preventing unauthorized access to the enclosed area;

determining a load adversity estimate for the contents;

upon the load adversity estimate being below a pre-established threshold, issuing an alert to a tenant;

upon the load adversity estimate meeting or exceeding a pre-established threshold, issuing an alert to a tenant or a premises management system and determining whether the physical lock is to be unlocked, wherein the alert to the tenant comprises a recommendation to reduce or increase the size of the enclosed area; and upon determining that the physical lock is to be unlocked, automatically unlocking the physical lock or issuing an unlock code to a communications device.

26. A system, comprising:

a device operable to detect contents comprising at least one object stored in an enclosed area and determine a load adversity estimate for the contents, wherein the enclosed area comprises a storage unit with a physical lock preventing unauthorized access to the enclosed area, contents comprising at least one object stored in the enclosed area; and a processor and a memory storing instructions, wherein the instructions are operable to cause the processor to:

receive the load adversity estimate from the device; and upon the load adversity estimate being below a pre-established threshold, issuing an alert to a tenant;

upon the load adversity estimate meeting or exceeding a pre-established threshold, issuing an alert to a tenant or a premises management system and determining whether the physical lock is to be unlocked, wherein the alert to the tenant comprises a recommendation to reduce or increase the size of the enclosed area; and upon determining that the physical lock is to be unlocked, automatically unlocking the physical lock or issuing an unlock code to a communications device.

27. A computer-implemented method, comprising:

detecting, by a device, contents comprising at least one object stored within an enclosed area, wherein the enclosed area comprises a storage unit with a physical lock preventing unauthorized access to the enclosed area;

determining an artificial interpretation of the contents;

determining a load adversity estimate based on the determined artificial interpretation;

upon the load adversity estimate meeting or exceeding a pre-established threshold, issuing an alert and determining whether the physical lock is to be unlocked, wherein the alert comprises a recommendation to reduce or increase the size of the enclosed area; and upon determining that the physical lock is to be unlocked, automatically unlocking the physical lock or issuing an unlock code to a communications device.

* * * * *